Sept. 7, 1926.
F. WEVER
1,599,386
MACHINE FOR MAKING FEATHER LINED AND SIMILAR MATERIAL
Filed May 15, 1922    12 Sheets-Sheet 1
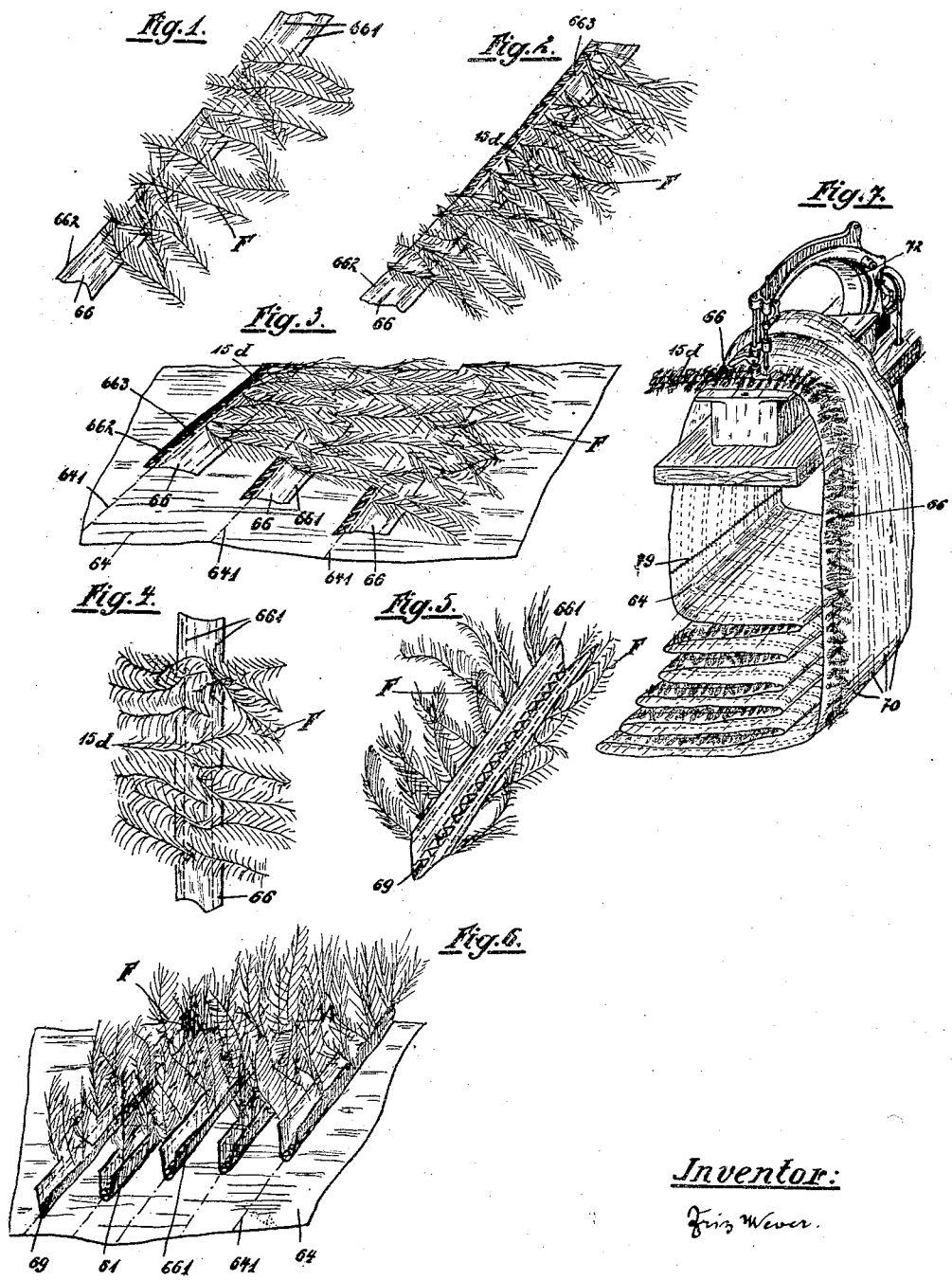
Inventor:
Fritz Wever.

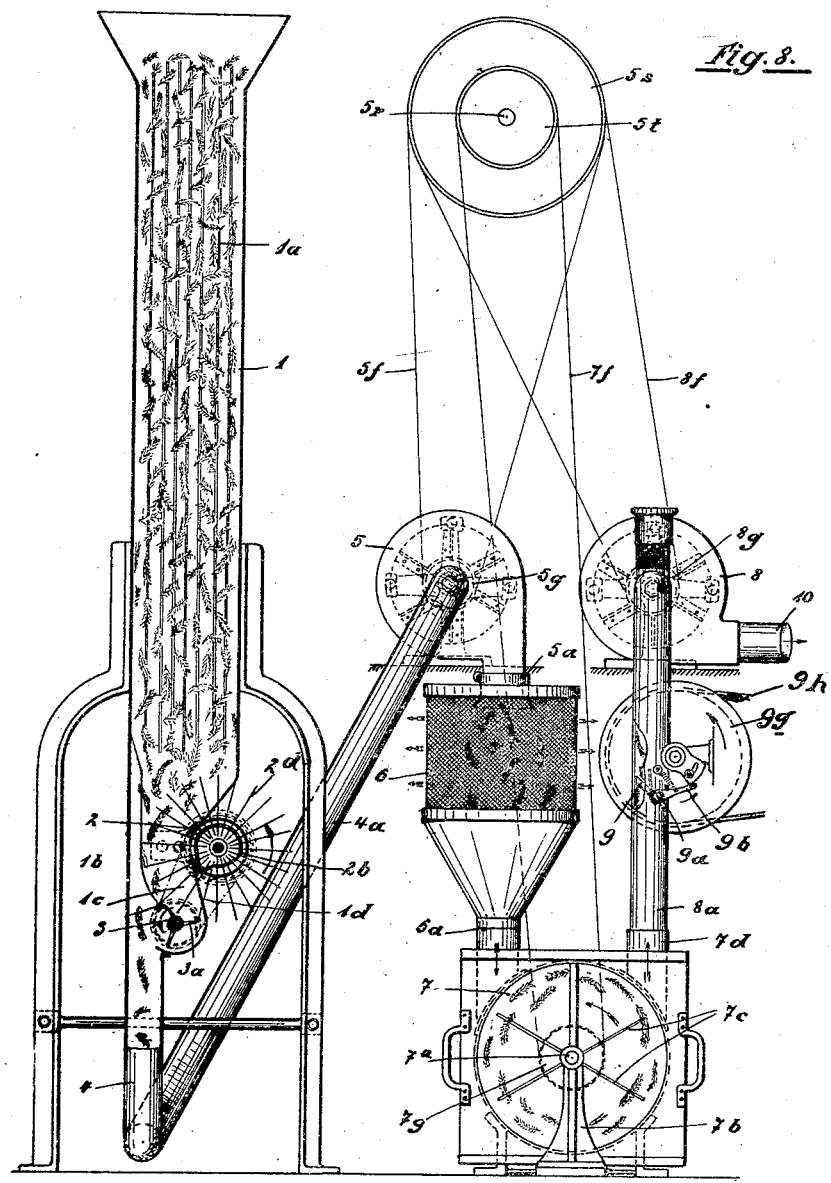

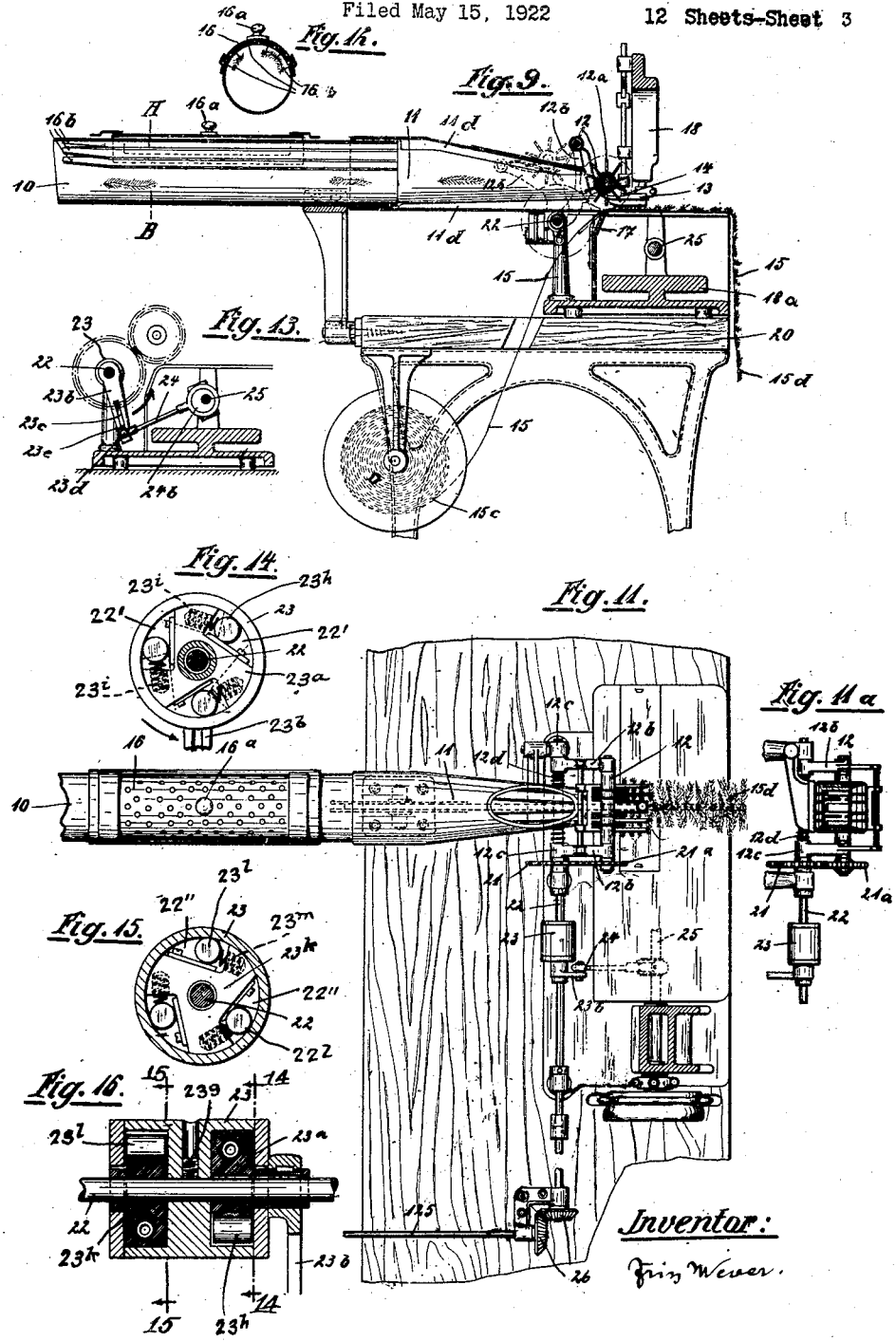

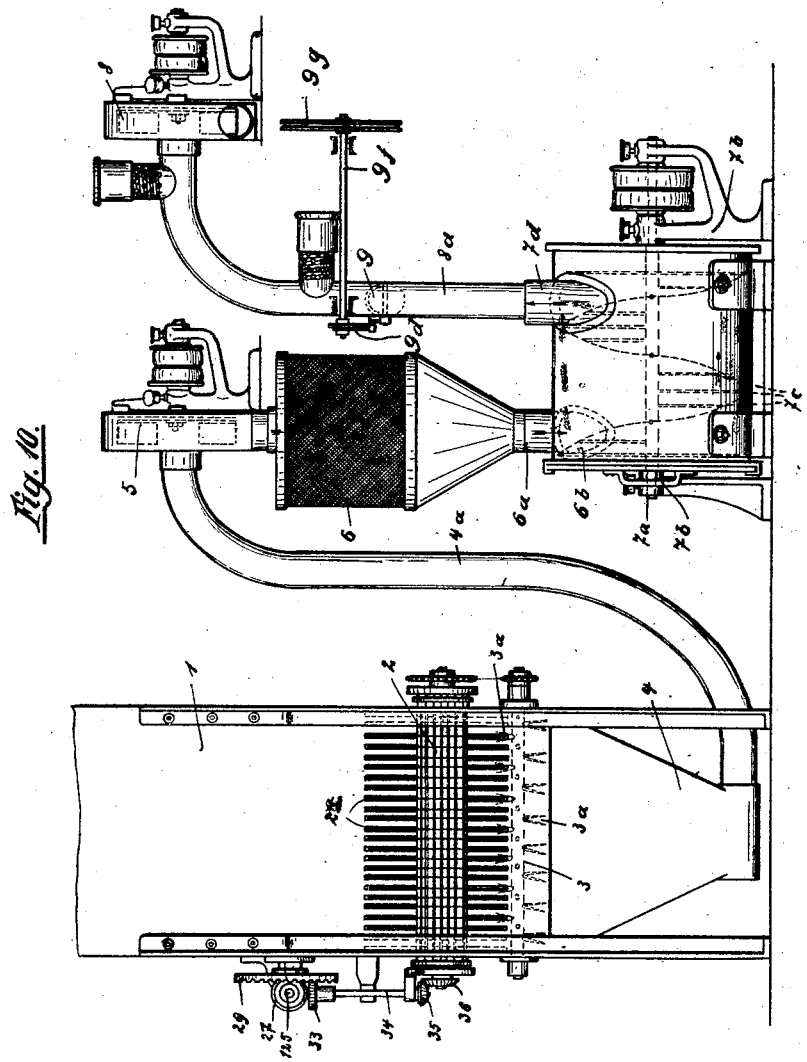

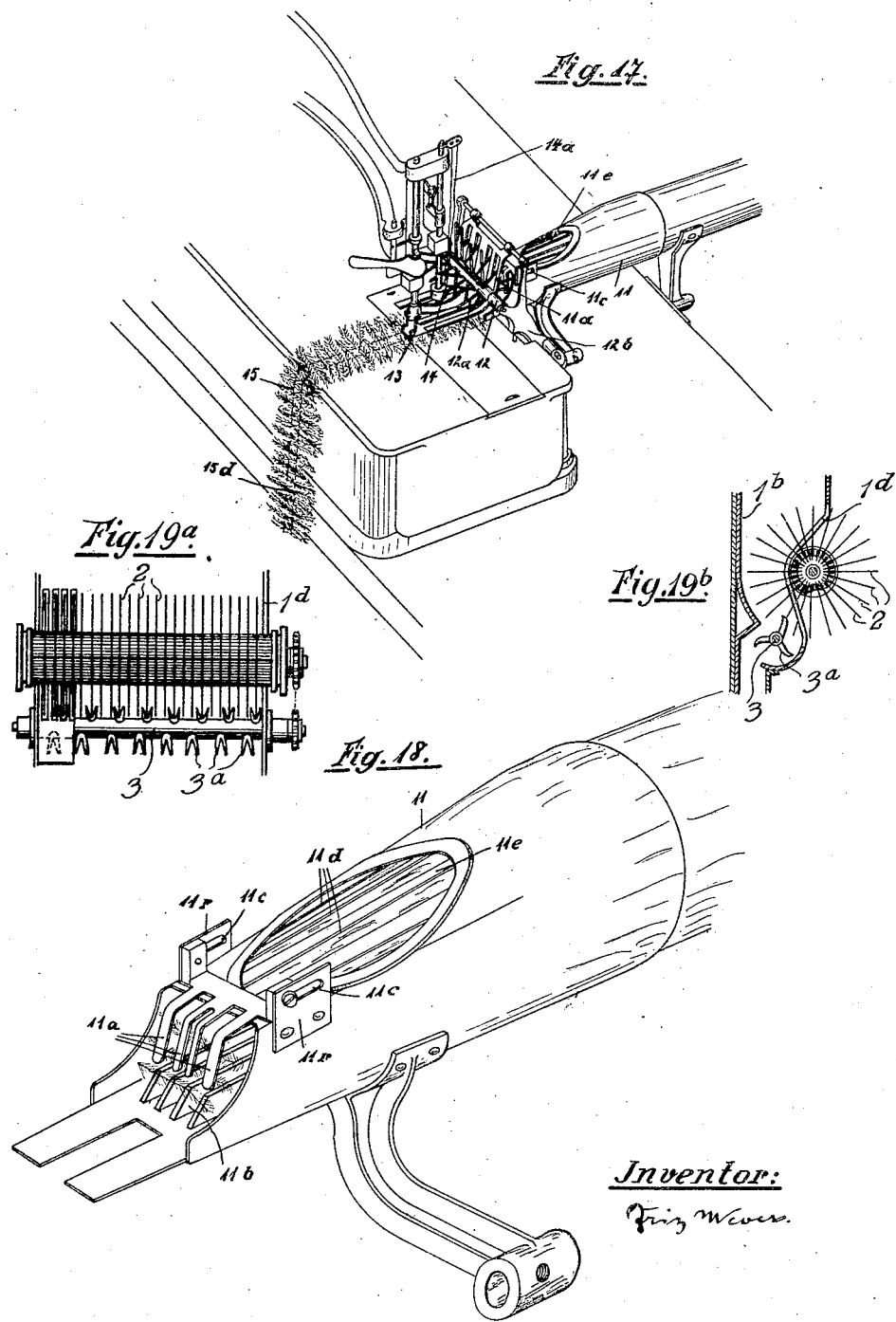

Sept. 7, 1926.
F. WEVER
1,599,386
MACHINE FOR MAKING FEATHER LINED AND SIMILAR MATERIAL
Filed May 15, 1922     12 Sheets-Sheet 6
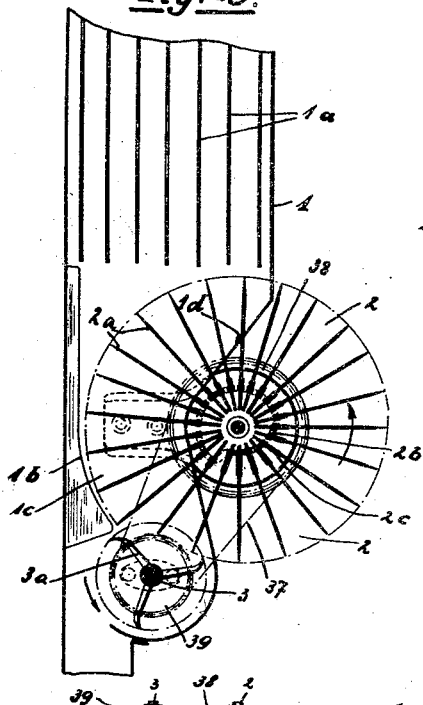
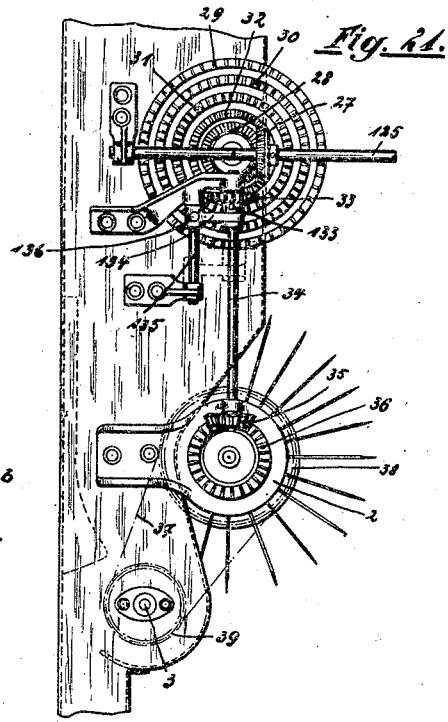
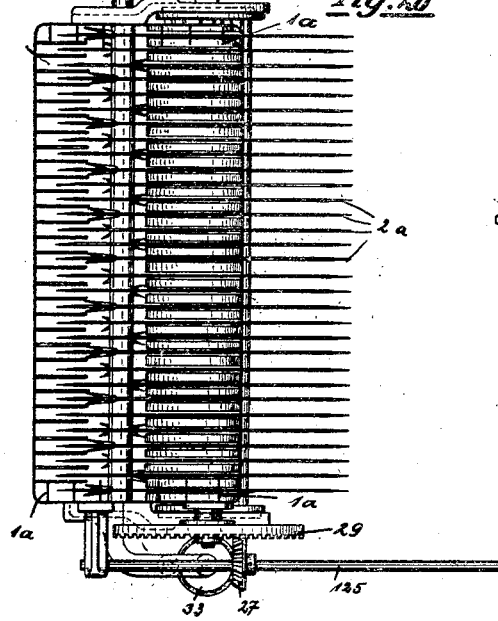
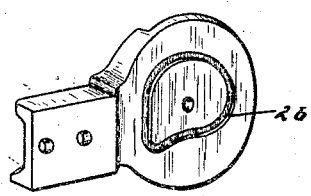
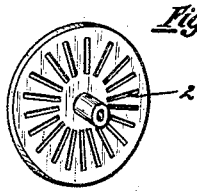
Inventor:
Fritz Wever.

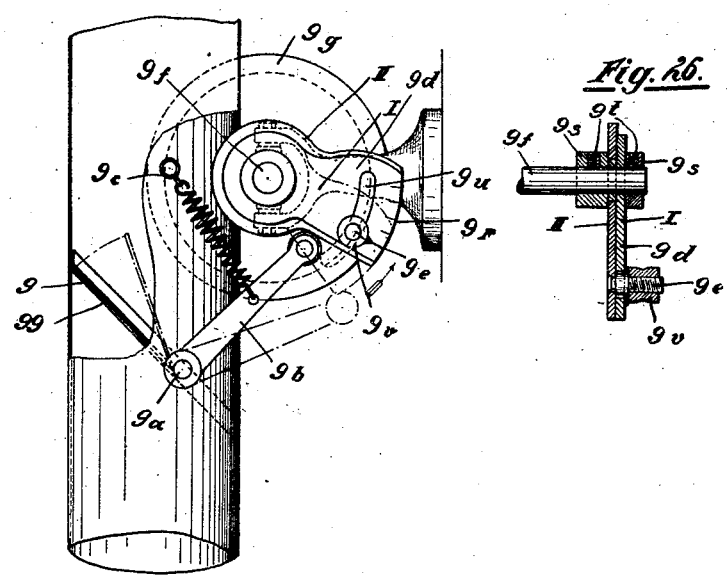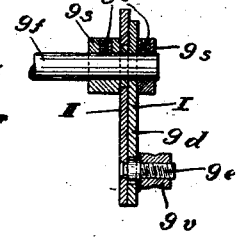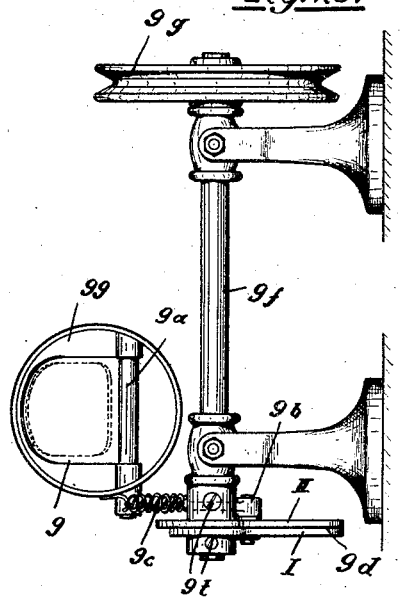

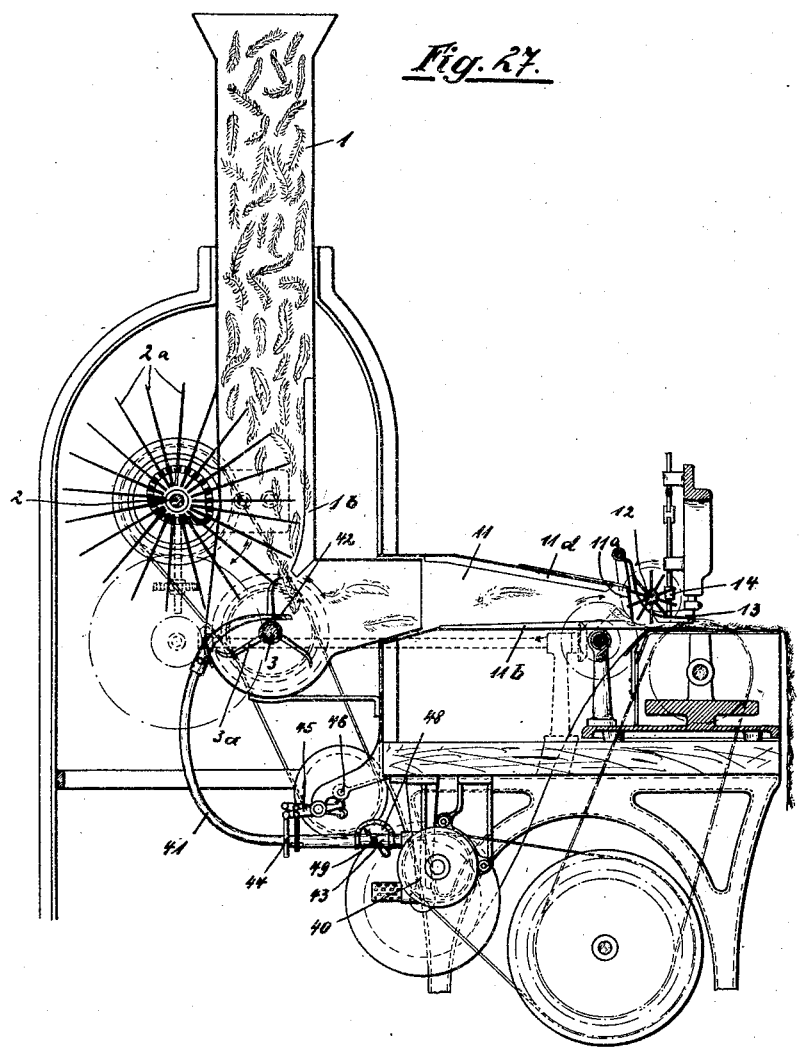

Sept. 7, 1926.
F. WEVER
MACHINE FOR MAKING FEATHER LINED AND SIMILAR MATERIAL
Filed May 15, 1922     12 Sheets-Sheet 9
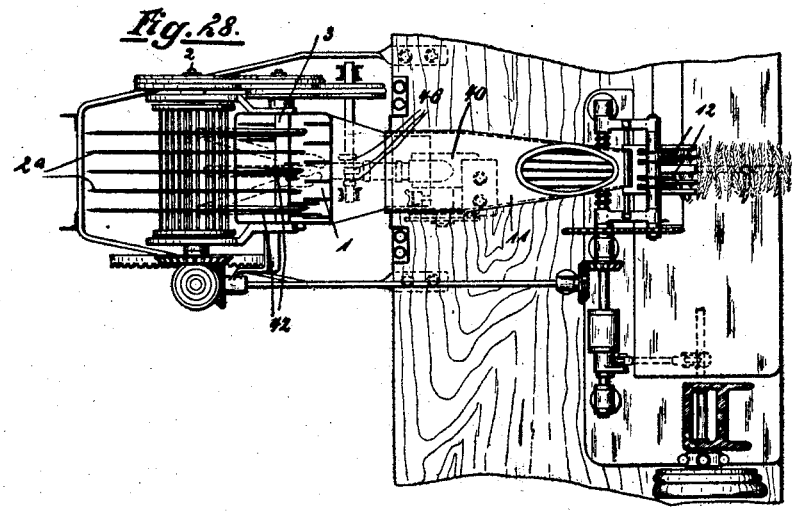
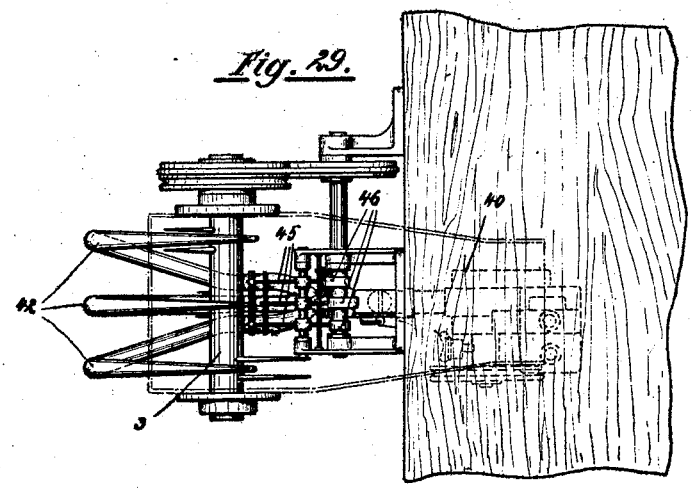
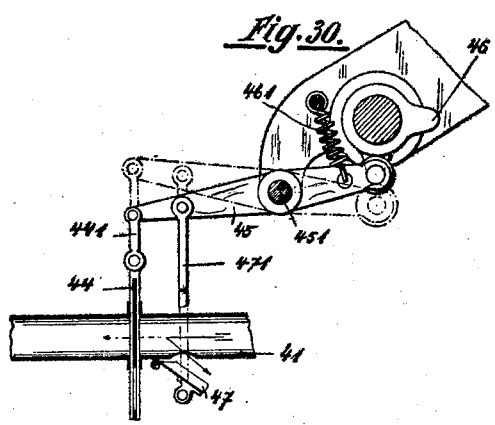
Inventor:
Fritz Wever Sept. 7, 1926.
F. WEVER
1,599,386
MACHINE FOR MAKING FEATHER LINED AND SIMILAR MATERIAL
Filed May 15, 1922     12 Sheets-Sheet 10
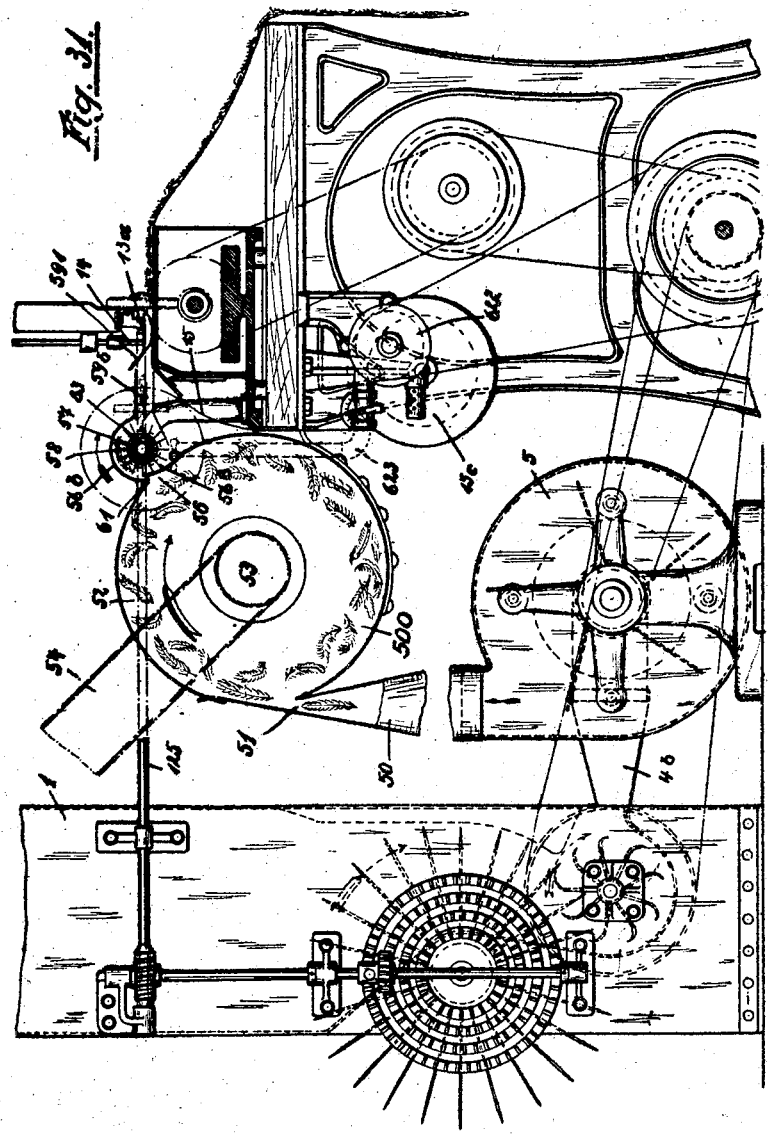
Inventor:
Fritz Wever.

Sept. 7, 1926.
F. WEVER
1,599,386
MACHINE FOR MAKING FEATHER LINED AND SIMILAR MATERIAL
Filed May 15, 1922 12 Sheets-Sheet 11
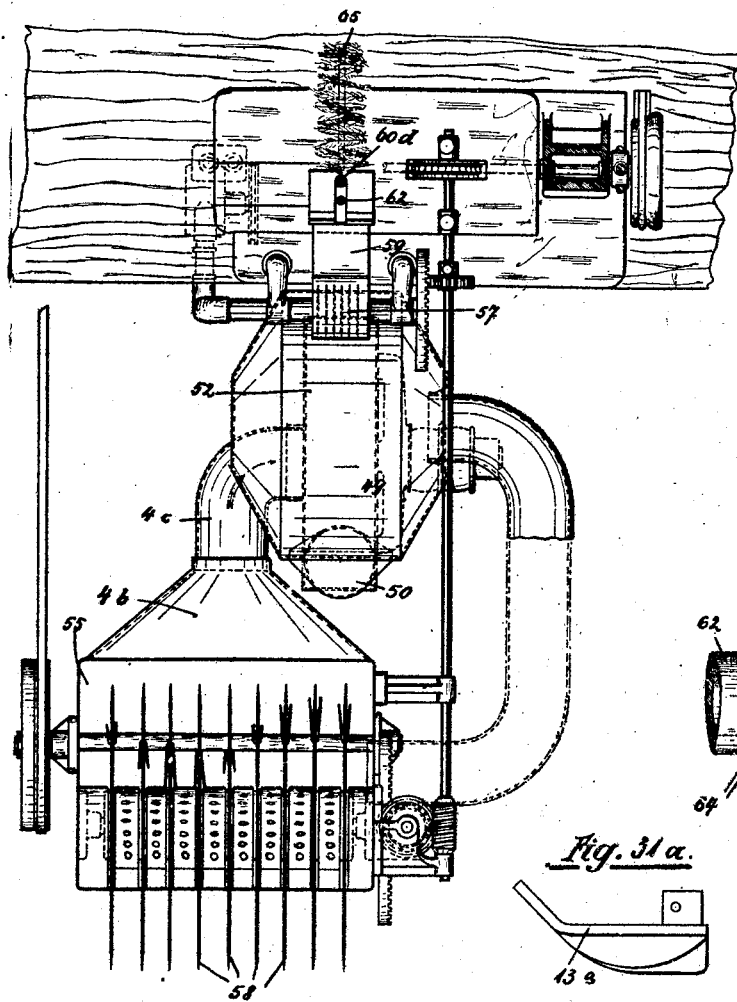
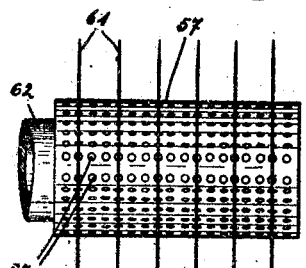
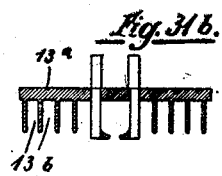
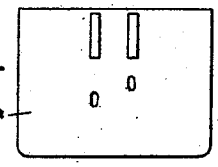
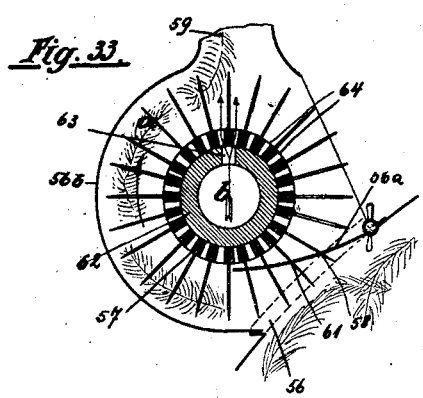
Inventor:
Fritz Wever

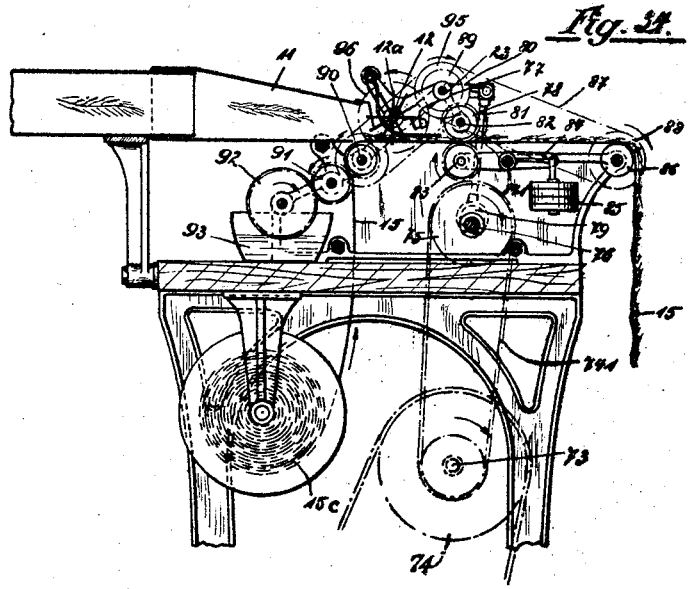

Patented Sept. 7, 1926.

1,599,386

UNITED STATES PATENT OFFICE.

FRITZ WEVER, OF STUTTGART, GERMANY; HENRI MARMIGNAT ADMINISTRATOR OF SAID FRITZ WEVER, DECEASED.

MACHINE FOR MAKING FEATHER-LINED AND SIMILAR MATERIAL.

Application filed May 15, 1922, Serial No. 561,216, and in Germany June 30, 1921.

This invention relates to the art of making fur or plumage-like material, and in particular such material as is made by securing feathers to supporting layers of sheet material, such as cloth or other textiles. Such material is adapted for use for cloaks, overcoats and garments of other descriptions, for covers and, in general, for all of the uses to which furs are applied, and it may be applied as an interior lining or an exterior covering.

The invention is designed to furnish means whereby the feathers or similar material are secured in a uniform and even layer to a layer of supporting material, preferably textile material, and in such a way that the operation of securing the feathers may be done expeditiously and with accuracy.

With these objects in view, my invention comprises means for advancing feathers in successive quantities to a sewing or other securing mechanism and at the same time feeding a band or strip of textile or other sheet material to the said securing means, the parts being so arranged that the feathers are spread in a flat, even and uniform layer onto the band or strip in successive quantities at a rate of speed conforming to the speed of the sewing or other attaching mechanism. To facilitate and aid this action I also provide means for loosening the feathers and preventing their agglomeration or tendency to stick together in lumps such means being arranged at a point behind the conduit through which the feathers are passed to the attaching mechanism.

For the purpose of further facilitating and simplifying the attachment of the feathers to the supporting layer my invention also comprises a method of first securing the feathers to a strip or band of textile or other suitable material and in then securing such feather-lined strip or band to a broad layer of supporting textile or other material in such a way preferably that the sections of the feather-lined band so secured are substantially parallel. The ends of the feathers projecting beyond the band, and thus forming a fringe, may in such case be so arranged that each row of feathers overlaps the feathers of the adjoining row, thus forming a plumage-like covering; or the feather fringes or edges may be caused to stand away from the supporting layer, the bands being in such case brought close together to give the whole a fur or plush-like appearance.

My invention, moreover, comprises details of construction and arrangement, and such other features, methods, means and combinations of parts as will be hereinafter set forth and more particularly pointed out in the claims forming part of this specification.

In the accompanying drawings I have shown what I consider the preferred manner of carrying my invention into practice.

In these drawings:

Figs. 1 and 2 are perspective views of a portion of a fabric strip or band with feathers secured thereto under my invention, showing two successive stages of completion;

Fig. 3, a similar view of a supporting fabric layer having such fabric strips secured thereto to form the completed fabric;

Figs. 4 and 5, a plan and a perspective view, respectively, of another form of feather-carrying strip or band in two successive stages of completion;

Fig. 6, a perspective view, showing the feather-carrying strips assembled and secured to a supporting fabric layer;

Fig. 7, a sewing apparatus for securing a feather-carrying strip to an endless supporting fabric layer, showing the operation of attachment.

Fig. 8, a side elevation of the left-hand portion, and

Fig. 9, a similar view of the right-hand portion of an apparatus for carrying out the process under my invention;

Fig. 10, a front elevation of a portion of the device represented in Fig. 8;

Fig. 11, a plan view of the sewing apparatus and adjacent parts represented in Fig. 9;

Fig. 11ª, a detail view of some parts thereof;

Fig. 12, a vertical cross-section on line A—B of Fig. 9;

Figs. 13, 14, 15 and 16 represent cross-sections of the actuating device for the feed-roller connected with the main shaft of the sewing apparatus;

Fig. 17, a perspective view of the sewing apparatus;

Fig. 18, a similar view, on an enlarged scale, of the mouth-piece leading to the latter;

Fig. 19, a vertical sectional elevation of a portion of the feather-hopper with the stripping and advancing parts;

Fig. 19ª, a similar view of the stripping and advancing parts on a reduced scale;

Fig. 19ᵇ, a sectional elevation of the same on the same reduced scale;

Fig. 20, a top plan view of the same on the scale of Fig. 19;

Fig. 21, a vertical sectional elevation of the actuating mechanism for the stripping and advancing parts;

Figs. 22 and 23, detail view of said mechanism;

Figs. 24, 25 and 26 are detail views of the valve-device arranged in feather duct or conduit;

Figs. 27 and 28 represent a modification in vertical section and plan, respectively;

Fig. 29, a plan of the compressed-air duct or pipe of same showing the exhaust mechanism;

Fig. 30, a detail view in sectional side elevation of said mechanism;

Fig. 31 represents a further modification in sectional side elevation;

Figs 31ª, 31ᵇ and 31ᶜ are a side view, a vertical sectional elevation and a plan view, respectively of a presser foot on an enlarged scale;

Fig. 32, a plan view on the scale of Fig. 31;

Fig. 33, a sectional detail view of the same;

Fig. 33ª, a detail side view of the same; and

Figs. 34 and 35, a vertical section and a plan, respectively, of a pasting apparatus, which may be employed in carrying out my new process.

In all the figures the same parts are indicated by the same reference characters.

In carrying out my invention, feathers of any suitable or desired kind are secured to a strip or band of any suitable sheet material, such as textile fabric, in such a manner as to extend laterally beyond such strip or band to form a fringe-like or scalloped edge on one or on both sides of the strip or band.

In Figs. 1 and 2 I have shown one form of such feather-lined strip or band 15ᵈ in successive stages of formation. From said figures it will be seen that feathers F are first spread over the band or strip 66 so as to mainly extend laterally only to one side of the same, whereupon they are secured to said band or strip by two rows of plain stitching 661. In thus spreading and securing the feathers to the strip or band, the feathers will also project to a small extent beyond the edge 662 opposite to the fringed feather edge. In order to make this edge accurately straight, the small projecting portions of the feathers are there bent over onto the strip or band and secured thereto by a line of cross-stitching 663, as seen in Figs. 2 and 3, or by other suitable means.

The feather-fringe strips or bands thus obtained are then secured, by stitching or otherwise, in substantially parallel arrangement to a supporting layer 64 of sheet material, such as textile fabric of any desired description, as will be understood from an inspection of Fig. 3, wherein 641 indicates the line of stitching employed for this purpose. From this figure it will also be noted that the feather-fringes each overlap the feather-layers of the adjacent bands or strips so as to form a flat scale-like or plumage-like surface. This arrangement is particularly adapted for the longer and stiffer qualities of feathers.

Where the softer grades of feathers, such as the softer tail feathers or what are known as boa-feathers, are to be employed, the method of securing them to the supporting layer illustrated in Figs. 4 to 6 is by preference employed. The feathers are here again secured to a band or strip 66 by a double row of stitching 661, but with this difference that the feathers are now disposed so as to extend substantially to an equal extent to both sides of the strip or band, thus forming a fringed edge at each side of the said strip or band. The double-fringed band or strip is then bent longitudinally along its middle line so as to form an acute angle in cross-section, or to be substantially parallel, as shown in Fig. 5, and secured in this shape in any desired or suitable manner. In the present case a line of stitching made by a two-needle sewing apparatus is employed. Or the connection may be effected in any other suitable way. The double-fringed strips or bands are then secured to the supporting layer 64 in substantially parallel rows so as to extend away from and to be substantially perpendicular thereto, as seen in Fig. 6, and in such proximity to each other that the completed fabric has a fur-like appearance.

As indicated in Figs. 1 and 4, the feathers are generally applied to the band or strip 66 in a uniform flat layer and in indiscriminate arrangement, that is to say, not accurately spaced or aligned, the quills of the feathers preferably extending in a direction generally transverse to the band or strip.

I find it advantageous to apply the feathers to a band of considerable length, or in the form of a web, in a continuous operation and to attach said web or band, after the feathers have been secured thereto, to the supporting layer 64 in one continuous operation. This manner of securing is illustrated in Fig. 7, where 72 represents a sewing apparatus of any suitable and desired construction and 64 the supporting fabric layer whose ends are secured together, as shown at 79, so as to form an endless sheet or apron. Before sewing, this endless supporting layer is marked with a helical line 70, which extends longitudinally over its entire surface and whose coils are sufficiently close together to form in substance parallel straight lines arranged at the desired distance from one another. Along this helical line 70 the feather-fringed strip or band 66 is secured to the supporting layer 64. When this securing operation has been completed and the supporting fabric has been covered with the feather strip or band, the securing connection at 79 is severed and the completed material is ready for use, to be made into garments and employed for other purposes for which it is fitted.

In Figs. 8 to 26 I have represented a machine embodying my invention which is particularly adapted for uniformly, continuously and successively securing the feathers to a narrow band or strip. For such purpose the machine, as will be seen from the following, is adapted to convey the feathers in a perfectly loose condition and in small allotments to the point where they are secured to said band or strip. It must be noted, however, that, while the apparatus disclosed in these figures is particularly adapted for this special purpose, it may with slight modifications be also employed for applying or securing the feathers to broad supporting layers.

In these figures 1 represents the supply hopper or holder through which the feathers are introduced into the apparatus. The supply hopper is provided at two opposite vertical walls with longitudinal ribs $1^a$, designed to facilitate the downward motion of the feather-charge by its weight, and to enable the current of suction air to pass into every portion of the hopper and thus to act uniformly on the feather-charge. These ribs appear in Figs. 8 and 19. As seen in Figs. 8, 10, 19 and 20, the lower end or outlet portion $1^c$ of the hopper is furnished with a device for retaining the feather-charge and for withdrawing the feathers in small quantities to be successively delivered for further treatment by the apparatus. This device comprises a series of longitudinal ribs $1^b$, preferably arranged on the wall of the hopper, which lies between the walls on which the ribs $1^a$ are formed, a roller 2 provided with picker-needles $2^a$ and a roller 3 provided with stripping forks $3^a$ arranged below and adjacent to the picker-needle roller 2 and in such position that the forks will straddle or engage the picker-needles $2^a$ as they pass the stripping fork roller, and that said fork will just clear the lower edges of the ribs $1^b$. As shown, the ribs $1^b$ have a curved contour corresponding to the path of the picker-needles $2^a$.

The picker-needle roller 2 and the stripping fork roller 3 are caused to rotate in the direction indicated by the arrows in Fig. 8 and Fig. 19; that is to say, so that, as the picker-needles $2^a$ move downward and outward, the stripping forks which engage or straddle these needles, as best seen in Fig. $19^a$, move inward and upward and past the lower corners of the ribs $1^b$, thus stripping the feathers in contact with the picker-needles $2^a$, from them and past the ribs $1^b$.

The picker-needles $2^a$, beside their rotary movement, have a radially reciprocating motion so as to advance as they enter the hopper, and then to be retracted as they leave the hopper, said reciprocating movement being imparted to them by a cam groove $2^b$ indicated in Figs. 8, 19 and 22, the needles $2^a$ being also radially guided by studs thereon engaging radial slots $2^c$, Figs. 19 and 23, of the needle supports. The details of the needle reciprocating device being already disclosed in my German Patent No. 330,444, issued December 14, 1920, and not constituting per se a part of my present invention, need not be further described herein.

The lower portion of the hopper is provided with slots $1^d$, Figs. 8 and 19, to permit the entrance of the picker-needles $2^a$ into the hopper.

In order to counteract any tendency in the feathers to agglomerate or to form in lumps, I provide means for loosening the feathers between the holder and the conduit for feeding the feathers to the attaching device. These means in the figures now under consideration comprise a suction-pipe $4^a$, an exhaust pump or blower 5, an expansion drum 6, a horizontal drum 7 provided with rotary conveyor arms $7^c$ and terminating in a suction pipe $8^a$ equipped with a trap or valve 9. The arrangement and construction of these parts in detail are, as follows:

The hopper 1 terminates in a downwardly converging portion 4 below the ribs $1^b$ and the stripping fork shaft 3, the said lower portion 4 communicating with the suction pipe $4^a$ at its inlet which suction pipe leads to the exhaust pump or blower 5, whose outlets or exit orifice $5^a$ communicates with and opens into the expansion drum 6, having wire-cloth or otherwise perforated sides through which compressed air escapes, thus permitting the feathers, as they issue from the lower orifice $6^a$, to freely drop into the horizontal drum 7 at the inlet $6^b$ near one side and end of said drum. A horizontal shaft $7^a$, journaled in bearings $7^b$, $7^b$, extends centrally through said drum 7 (Figs. 8 and 10). Said shaft carries a series of radial arms $7^c$ arranged thereon helically so as to form a helical conveyor which not only imparts a centrifugal movement to the feathers, but propels them to the end of the drum opposite to that where they enter said drum, thereby forming a thin stream or band of feathers which is in motion toward the outlet $7^d$, of the drum 7, arranged diagonally opposite the inlet or orifice $6^a$. A second suction pump or blower 8 serves to exhaust the air from the drum 7 through the outlet $7^d$ communicating therewith by means of suction-pipe $8^a$.

In order to regulate the amount of feathers withdrawn from the drum 7 by the suction pump 8 and to time such withdrawal, a trap or valve 9 is arranged in the suction-pipe $8^a$ at an intermediate point, as seen in Figs. 8 and 10, the mechanism for periodically opening and closing said trap or valve being represented in detail in Figs. 24 to 26, inclusive. The trap or valve 9 is arranged to rock or oscillate on the pivot or journal $9^a$ and is rigidly connected with the rock-lever $9^b$ provided with a friction roller at its end, while a spring $9^c$, connected to the rock-lever $9^b$ at one end and to the suction-pipe $8^a$ at the other tends to yieldingly press the trap or valve 9 against its seat 99 within said suction-pipe. The rock-lever $9^b$ is yieldingly held against the periphery of the cam or wiper $9^d$ by the spring $9^c$, the said cam or wiper being mounted on the rotary shaft $9^f$, which is caused to rotate by the pulley $9^g$ keyed thereto and receiving power from any desired source through the belt $9^h$, Fig. 8. Said belt $9^h$ preferably receives its motion from the sewing or feather-attaching mechanism by suitable intermediate gearing. The shaft $9^f$ being caused to rotate in the direction of the arrow in Figs. 8 and 24, the wiper $9^d$ causes the rock-lever $9^b$ to rock from the full-line position in Fig. 24 to the dotted position of said figure against the stress of the spring $9^c$, thereby opening the trap or valve 9, maintaining said lever and valve in such open position for a period of time governed by the length of that part of the periphery of said cam which is the most remote from the centre of rotation, as will be readily understood. In order to vary the length of the periods during which the valve is to remain open, the cam or wiper is composed of two superimposed cam-disks I and II, which may be shifted axially one with respect to the other, thereby decreasing or increasing the length of the valve-opening part of the cam-periphery $9^r$. For this purpose each cam-disk is provided with a hub $9^s$ encircling the shaft $9^f$ and adapted to be fixed thereon by a set screw $9^t$. Cam-disk I is provided with a slot $9^u$ concentric to the shaft $9^f$ and cam-disk II with a screw-stud $9^e$ passing through and engaging said slot. When the disks have been adjusted to the desired relative position, for which purpose the set-screws $9^t$ must first be loosened, they are secured in the new position of adjustment by tightening a clamp-nut $9^v$ engaging the screw-stud $9^e$, the set-screws $9^t$ being then again tightened on the shaft $9^f$.

The suction pump 8 blows the air and the feathers from the suction-pipe $8^a$ through the conduit or pipe 10 into the feather-spreading device in which the conduit or pipe terminates, and which, as seen in Figs. 9, 11, 17 and 18, is in the form of a nozzle or mouthpiece 11 having imperforate walls arranged behind and adjacent to the sewing mechanism, and removably connected to the forward end of the conduit 10, as seen in Figs. 9 and 11. As best disclosed in Fig. 18, the orifice of the said mouthpiece is furnished with a yielding feather-retaining device or detent comprising an upper set of prongs or fingers $11^a$ preferably of resilient material, and a lower series of ribs $11^b$ preferably arranged in staggered relation to the said prongs so that each of said prongs will lie opposite the interval between two ribs. These prongs co-operate with the ribs to arrest the feathers in their passage through the nozzle and to cause them to lie transversely over the ribs. The prongs $11^a$ are in the form of a rake which is longitudinally adjustable on the mouthpiece or nozzle by being mounted in its supports $11^r$ by a screw pin and slot connection $11^c$, as will be readily understood from Fig. 18. The interior surface of the mouthpiece is provided with a series of longitudinal ribs $11^d$, extending to the orifice, as shown in Figs. 9 and 18. Such ribs, while permitting the ready escape of the air, serve to prevent the formation of eddy currents of the air which would interfere with the regular and unimpeded issue of the feathers from the orifice. For the same purpose the feed-pipe 10 is equipped with a perforated slide 16 having a handle $16^a$, the pipe 10 below said slide being so perforated also that when it is desired to permit the escape of air from the pipe the slide may be so shifted as to cause its perforations to register with those of said pipe. As seen in Figs. 9 and 12, this perforated part of the tube is provided with a series of longitudinal ribs $16^b$ which prevent the feathers from being pressed against the perforations by the air tending to escape when the said perforations are uncovered, and facilitate their forward feed to the orifice by virtue of the greater pressure of the air in the direction of said pipe. At $11^e$ the nozzle 11 is provided with a window or transparent covering to enable ready inspection of the interior.

A sewing mechanism adapted to produce the two lines of stitching shown in Figs. 1 to 6 and comprising the presser foot 13 and needle bar 14, for carrying the double needle for the two threads $14^a$, Fig. 17, is arranged in advance of the mouthpiece or nozzle 11, as shown in Figs. 9 and 17. Between said sewing apparatus and nozzle is arranged a feather-picking mechanism for releasing successive quantities of feathers from the arresting prongs or fingers 11$^a$ and feeding them onto a strip of feather-supporting material 15, which is fed to the sewing mechanism from the web 15$^c$, as best seen in Fig. 9. This feather-picking mechanism consists of a roller 12 provided with radial picker-needles 12$^a$ arranged thereon, as best seen in Figs. 9, 11 and 17. These picker-needles are so arranged as to enter the slots between the prongs 11$^a$ as the roller revolves, and withdraw the feathers held against said prongs by the air current, dropping them onto the band or strip 15 on which they are fed to the needle 14$^a$ and under the presser foot 13, as seen in Figs. 9 and 17.

The roller 12 carrying the picker-needles 12$^a$ is journaled in a rock-frame 12$^b$, pivoted to the machine frame at 12$^c$ and yieldingly held against the nozzle 11 as shown by the full lines in Figs. 9, 11 and 17, by a spring 12$^d$ encircling the pivot or journal 22, Figs. 9 and 11, and may be swung out of the way against the stress of said spring into the dotted-line position indicated in Fig. 9, in order to expose the parts where the sewing proceeds and to obtain ready access thereto in case of disturbances or interruptions in the sewing operation. For this purpose the mouthpiece 11 is first removed from the conduit 10.

The main shaft of the sewing mechanism, receiving motion from any suitable source of power, is represented at 25, Figs. 11 and 13. It imparts an intermittent rotary motion to the picker-needle shaft or roller 12 by any suitable intermittent propelling device. In the present instance this is accomplished by means of an eccentric 24$^b$, Fig. 13, which, through rod 24, oscillates a crank 23$^b$ of the friction-clutch device 23, Figs. 11, 13, 14, 15 and 16, mounted on the journal 22. As will be noted by reference to said Figs. 11, 13, 14, 15 and 16, the said clutch-device comprises a cylindrical casing 23 keyed to the shaft 22 by a set-screw 23$^g$. Within the casing 23 is aranged the drum 23$^a$ keyed to the crank 23$^b$, which is loosely mounted on shaft 22, and provided with a number of notches or chambers 22′ within each of which is seated a roller 23$^h$ impelled forward by a spring 23$^i$ and just fitting into the space formed by the notch and the inner wall of the casing 23. When the crank moves in the direction of the arrow in Fig. 13 and in Fig. 14, which is a cross section on line 14—14 of Fig. 16, looking in the direction of the arrow in said Figure, the rollers 23$^h$ will be clamped or wedged between the casing 23 and the seat of the roller, whereby a partial revolution is imparted to the shaft 22. On the return stroke of the crank 23$^b$ the rollers are released and the drum 23$^a$ returns to its initial position, the shaft 22 remaining stationary during this return movement. In order to positively secure the said shaft against any retrograde movement, a brake drum 23$^k$, also loosely mounted on the shaft 22 and secured to the shaft-bearinging is arranged in the casing 23, as shown in Figs. 15 and 16. As seen from Fig. 15, this brake drum 23$^k$ is provided with notches 22″ and spring rollers 23$^l$, similarly to the shaft-actuating clutch-device 22′, 23$^h$, but with the difference that, in this case, the rollers are pressed in the reverse direction by the springs 23$^m$. By this means any tendency of the shaft to reverse its rotation on the return stroke of the crank 23$^b$ will be immediately arrested by the fact that the rollers 23$^l$ will be clamped between their seats and the casing wall. The intermittent rotary motion of the journal 22 is transmitted to picker-needle roller 12 by means of the gear wheels 21 and 21$^a$, as shown in Figs. 11 and 11$^a$. The journal or shaft 22, by means of the intermeshing bevel gear-wheels 26, transmits motion to the longitudinal shaft 125, Figs. 11, 20 and 21. The shaft 125 is provided at its other end with a bevel gear-wheel 27 meshing with a bevel gear 28 forming a fixed part of a disk formed with four concentric crown gears 29 to 32 thereon. The picker-needle shaft 2, as shown in Figs. 10 and 21, has keyed to its end a bevel gear-wheel 36, meshing wih a beveled gear-wheel 35, mounted at the lower end of a shaft 34 bearing at its upper end a pinion or gear-wheel 33, which is longitudinally shiftable on said shaft 34 so as to be adjusted to engage or mesh with any one of the four crown-gearings 29 to 32 and adapted to be secured in each position of adjustment. For this purpose, as shown in Fig. 21, the said pinion 33 is mounted on a hub 133 slidably keyed to shaft 34 and held in each position of adjustment by an arm 134, one end of which loosely encircles the hub 133, so as to permit it to revolve therein, while the other end engages a stud 135 secured to the hopper 1, on which it may be vertically shifted and secured in each position of vertical adjustment by the set-screw 136. By this arrangement the pinion 33 may be caused to engage any desired one of the crown-gearings 29 to 32 and to be rotatably secured in each position. As seen in Figs. 19 and 21, motion is transmitted from the picker-needle shaft 2 to the shaft 3 carrying the stripping forks 3$^a$ by means of a belt or chain 37 running over pulleys or sprocket-wheels 38 and 39 on the shafts 2 and 3, respectively.

In order to vary the extent or speed of rotation of the shaft 22 and thereby the quantity of feathers removed from the hopper 1, at each impulse, the end of rod 24, Figs. 11 and 13, is secured to the crank 23ᵇ by a pin 23ᵈ engaging a slot 23ᶜ in said crank and adapted to be secured in any desired position of adjustment, as best seen in Fig. 13.

The suction-pumps 5 and 8 and the radial conveyor arms 7ᶜ are actuated from a common main power shaft 5ʳ by means of belts or chains 5ᶠ, 8ᶠ and 7ᶠ, respectively, running over main pulleys or sprocket-wheels 5ˢ and 5ᵗ and pulleys 5ᵍ, 8ᵍ, and 7ᵍ, respectively, as shown in Fig. 8. The power from said main shaft 5ʳ may also be transmitted, directly or indirectly, to the main shaft 25 of the sewing mechanism and to the pulley 9ᵍ, Fig. 8.

In operation the feathers as they descend in the hopper 1 are, at the lowermost portion of the hopper, fed downward by the picker-needles 2ᵃ as the needle roller 2 revolves in the direction of the arrow, Fig. 8, until they are taken off from the picker-needles by the stripper forks 3ᵃ, rotating as indicated by the arrow, and drawn down past the lower corner of the ribs 1ᵇ, so as to drop into the downwardly converging portion 4, such action being aided by the draft from the suction-pipe 4ᵃ. Thence the suction-pump 5 draws them through the pipe 4ᵃ, dropping them into the expansion drum 6, from which they pass downward into the drum 7 to be fed therefrom in a thin stream passing onward to the exit 7ᵈ, due to the centrifugal and forwarding action of the helically arranged radial arms 7ᶜ. As the valve or trap 9 in the suction-pipe 8ᵃ is periodically opened, portions of this feather stream are by the suction-pump 8 drawn into the feed-tube 10, the quantity of feathers being governed by the time the adjustable valve or trap remains open at each impulse. Through the tube 10 the feathers pass onto the nozzle 11 at the forward end of which they are arrested by the prongs 11ᵃ, being withdrawn therefrom by the picker-needles 12ᵃ of the intermittently revolving needle-shaft 12, and deposited on the advancing band or ribbon 15, the band with the feathers thereon then passing under the presser foot 13, and needle-bar 14 of the sewing mechanism, where the feathers are connected to the band or ribbon by stitching, as above explained, and the whole issues from the machine in the form of a feather-lined or fringed strip 15ᵈ, as shown in Figs. 9, 11 and 17. By adjusting the supports 11ʳ and with them the prongs or feather arrester 11ᵃ away from or toward the picker-needles 12ᵃ, a less or greater quantity of feathers will be withdrawn from the nozzle and, accordingly, the layer of feathers deposited on and secured to the band 15 will be of less or greater thickness. By this co-operation of the picker-needles and the retaining fingers the feathers are spread in an even, uniform and continuous layer on the band or strip 15 as it passes below these parts and are in this condition secured to the band by the sewing mechanism.

The form of embodiment of my invention thus far described is particularly adapted for the lighter varieties of tail-feathers and feathers showing a tendency to agglomerate and which require separating and loosening action. It may be so arranged as to feed the feathers to several sewing mechanisms simultaneously. For the heavier sorts of feathers, such as wing feathers, which require no loosening or separating action, the modified embodiment of my invention represented in Figs. 27 to 30, inclusive, is preferably adapted.

This modification is arranged to directly adjoin the table of the sewing apparatus. The hopper 1 with picker-needle shaft 2, and stripping fork shaft 3, the feed-nozzle 11, with the feather-arresting prongs 11ᵃ and ribs 11ᵇ, and the picker needle shaft 12, as well as the mechanism for actuating these parts, are the same as in the first embodiment. What distinguishes the second embodiment from the first is that the feathers are not carried forward by suction, but that they are removed from the forked strippers 3ᵃ of the stripper-shaft and carried to the nozzle 11 by a blast or blasts of compressed air. For this purpose there is arranged at 40 an air compression pump or blower, the air from which passes through pipe 41 to the mouthpiece comprising in the present instance a plurality of jet-orifices 42, (see Figs. 28 and 29) arranged so as to blow the feathers from the forks 3ᵃ into and through the mouthpiece 11 toward the arresting prongs 11ᵃ and the picker-needle roller 12, where they are further operated on in the same manner and by the same means as in the first embodiment of my invention. The air-pipe 41 is provided with an air-cock 43, by which the rate or quantity of air-discharge into said pipe may be regulated, the regulating operation being guided by a scale 48 and a pointer 49 arranged to travel over said scale and mounted on the plug of the cock. In order to discharge the air from the jet-orifices in intermittent streams or gusts, the pipe 41 is furnished with a reciprocating slide-valve 44, Figs. 27 and 30, to alternately open and shut off said pipe, said slide 44 being raised to the dotted line position, Fig. 30, and thus opened, by a cam or tappet-wheel 46 bearing on one arm of a rock-lever 45 fulcrumed at 451, the other arm of which is connected to said slide 44 by link 441, and thereupon quickly lowered to shut off the pipe by a spring 461 arranged to draw the lever against cam or tappet-wheel 46. In order to discharge the compressed air from the pipe 41 when the slide valve is lowered and closed, and thereby to eliminate injurious back-pressure on the compression pump or blower, a flap valve or vent 47 is arranged on the pipe 41 behind the slide-valve 44, said flap-valve being operated from the rock-lever 45 by the connecting rod 471, connected to said rock-lever and the flap-valve, as seen in Figs. 27 and 30. From the arrangement thus shown it will be seen that the flap-valve will open when the pipe 41 is shut off by the slide 44, and shut when it is open.

Under this modified form of apparatus the feathers are blown in successive allotments from the stripping forks 3ª into the nozzle 11 and against the feather-arresting prongs 11ª, to be further acted on as in the first form of the apparatus and in the manner already described in connection therewith.

The third form of apparatus embodying my invention, represented in Figs. 31 to 33, which is particularly adapted for short, light feathers which require a loosening or segregating action as they are fed forward, has the supply hopper 1 in combination with the picker-needle and stripping fork mechanism and the suction-pump for advancing the feathers already described in common with the first embodiment of my invention. It is, however, distinguished therefrom by the following details:

Above the suction-pump 5 is arranged a drum 500, into which the feathers are blown by the suction-pump 5 through the pipe 50 having an orifice 51 of flat cross-section and arranged tangentially to the cylindrical walls of the drum, as seen in Fig. 31. By this arrangement a circular air current having centrifugal action and which entrains the feathers is generated. The arrow 52 indicates the direction of this air current and of the stream of feathers borne by it. As the air current thus circulating in the drum is gradually retarded in speed it is forced toward the center of the drum by the air of greater speed continuously entering at the orifice 51, and leaves the drum by the central outlet 53, from which point it, together with the surplus of feathers carried by it, is returned to the hopper 1 by waste pipe 54, Figs. 31 and 32. As seen from the drawing, the axis of the drum 500 is horizontal, as in the case of drum 7 of the first embodiment of the invention. In this modification the suction pump 5, the drum 500 and the corelated parts constitute the loosening mechanism. At the upper forward portion the cylindrical walls of the drum 500 are left open so as to form an outlet 56, said outlet being provided with a series of tongues 61 which are bent away outward, whereby an outlet opening 56 is formed at this part of the drum, as best seen in Figs. 31 and 33. Through this outlet 56 the drum communicates with the casing 56ᵇ, constituting a conduit to the mouthpiece or nozzle 59, and within which is journaled a picker-needle shaft 57, adapted to rotate in the direction of the arrow a, from whose surface extends a number of radial picker-needles 58. The picker-needles are arranged to travel in the slots 56ª between the tongues 61. According as the tongues, which are adjustably arranged or hinged (see Figs. 33 and 33ª), are brought nearer to or removed farther from the shaft 57, the outlet 56 is enlarged or contracted and the rotating picker-needles 58 are caused to penetrate to a greater or less extent into the feather stream circulating past the orifice and thus a layer of greater or less thickness will be fed forward into the mouthpiece and thence to the band or ribbon to which the feathers are to be secured. As shown in Fig. 31, in Fig. 33 and Fig 33ª, the rotary needle-shaft 57 is hollow and formed with perforations 64 between the needles 58. It is mounted on and encircles the stationary hollow axle 62, said axle being formed with a longitudinal slot 63 communicating with its hollow interior and arranged on the side of said axle facing the mouthpiece 59. The interior of the axle 62 communicates with an air-compressing pump 622 by air pipe 623, said pump and its connections being arranged and constructed as in the example shown in Figs. 27 to 30.

In operation, as the needle-shaft 57 revolves on the hollow axle 62, the perforations 64 of the former are successively brought in front of the slot 63, whereby the compressed air from the pump is caused to escape, thereby blowing the feathers from the picker-needles 58 into the nozzle 59 and thence to the sewing apparatus, which secures them to the ribbon or support which is concurrently fed thereto, as in the previously described forms of apparatus.

The needle-shaft 57 is actuated from the sewing mechanism in the same manner as in the case of the first embodiment of my invention above described. The mouthpiece 59, as best shown in Fig. 31, terminates in a downwardly tapering nozzle 591 which serves to direct the stream of feathers in the form of a flat layer onto the band or ribbon 15 passing from the reel 15ᶜ below said nozzle, as shown, and with it under the presser-foot 13ª and needle bar 14. The presser-foot 13ª, as seen best in Figs. 31ª and 31ᵇ, is formed with passages 13ᵇ to permit the free passage and escape of the compressed air from the pump 622, thereby preventing the balling up or clustering of the feathers in lumps and insuring their attachment to the band or ribbon in a thin, even layer.

Where the feathers are to be secured to the ribbon or band 15 by pasting, I arrange the attaching portion of the machine in the manner represented in Figs. 34 and 35. The means for loosening, distributing and feeding the feathers to this securing device are as hereinbefore described.

The pasting mechanism is operated from shaft 73 carrying a pulley 74 revolving in the direction indicated by the arrow and transmitting its movement to pulley 75 in the direction of the arrow by cord 741. Pulley 75 is keyed to shaft 76. On the shaft 77 is arranged a clutch-device 231 like the clutch-device 23 set forth in connection with the first embodiment of my invention, said clutch-device being actuated by rod 78 extending from and receiving its motion from the eccentric 79, mounted on shaft 76 in the same manner as in the said first example and as will be readily understood. The shaft 77, which is thereby intermittently rotated in the direction of the arrow, communicates its motion to the feed-roller 82 by means of the intermeshing gear wheels 80 and 81, Fig. 35. Below the feed-roller 82 is arranged a pressure roller 83 mounted at one arm of a lever 84, fulcrumed at 841, a weight 85 being suspended from the other arm to yieldingly hold the roller 83 against the feed-roller 82.

The paste or other adhesive matter is contained in the paste-trough 93 into which the paste-roller 92 dips. The paste-roller in revolving transfers the paste to the doctor-roller 91, which applies the same to the band or ribbon 15 to which the feathers are to be secured, which band or ribbon is fed forward from the ribbon-reel 15ᶜ between doctor-roller 91 and the feed-roller 90, thence below the outlet of nozzle 11 and between the rollers 82 and 83, which serve to press and fasten the feathers as they are forwarded from the mouthpiece 11 by the picker-needles 12ᵃ. The mouthpiece and picker-needles and co-acting parts are arranged and constructed as in the first embodiment of my invention. The ribbon with the feathers attached thereto then passes out of the machine over the roller 86, as shown. The parts move and revolve as indicated by the arrows in Fig. 34.

As in the case of the shaft or journal 22 in the first embodiment of the invention, the shaft 77 is connected with the means for feeding the feathers from the hopper 1. Thereby the feeding of feathers from said hopper will cease whenever the operation of the pasting mechanism is interrupted.

While I have herein described the modification illustrated in Figs. 27 to 30, inclusive, and also the modified form represented in Figs. 31 to 33, inclusive, in illustration of the scope of my invention, and covered the same by generic claims, I do not herein specifically claim these modifications, since they are thus specifically claimed in my applications Serial Nos. 722,187 and 722,188, respectively, which applications were filed on June 24th, 1924, as divisional applications from this application.

Moreover, it is to be observed that, while I have in this specification described a feather-lined material and the process of making the same for purposes of a full disclosure of my invention and in illustration of the uses to which it is to be applied, I do not herein claim such material or product and process since the same is claimed in and constitutes the subject-matter of my application, Serial No. 722,186, filed June 24th, 1924, which is a divisional application from this application.

What I claim and desire to secure by Letters Patent is:

1. In an apparatus of the character set forth, a holder for feathers and a series of picker-needles arranged to enter and travel past the outlet portion of the holder, in combination with a series of stripping forks arranged to travel past the picker-needles to strip the feathers therefrom the stripping forks being arranged to straddle and engage the picker-needles as they pass them.

2. In an apparatus of the character set forth, a holder for feathers, provided with interior longitudinal ribs, in combination with a series of picker-needles arranged to enter and travel past the outlet portion of the holder, and a series of stripping forks arranged to travel past the picker-needles to strip the feathers therefrom.

3. In an apparatus of the character set forth, a holder for feathers, in combination with a series of rotary picker-needles arranged to enter and travel past the outlet portion of the holder, and a series of rotary stripping forks arranged to travel past and to straddle the picker-needles as they pass them to strip the feathers therefrom.

4. In an apparatus of the character set forth, an interiorly and longitudinally ribbed holder and a rotary series of picker-needles arranged to enter and to travel past the outlet portion of the holder, in combination with a rotary series of stripping forks arranged to travel past and to strip the feathers from the picker-needles.

5. In an apparatus of the character set forth, a holder for feathers formed with longitudinal slots at its lower outlet portion, and a rotary series of picker-needles arranged to enter said slots, in combination with a series of interior ribs arranged at the lower portion of the holder, facing said picker-needles and having a contour corresponding to the path of the needle extremities, and a rotary series of stripping forks arranged below the picker-needles and the ribs.

6. In an apparatus of the character set forth, a holder for feathers formed with longitudinal slots at its lower outlet portion and a rotary series of picker-needles arranged to enter said slots, in combination with a series of interior ribs arranged at the lower portion of the holder, facing said picker-needles and having a contour corresponding to the path of the needle ends, and a rotary series of stripping forks arranged to straddle the picker-needles as they pass by the same, said stripping forks being so arranged as to just clear the lower edges of the ribs in their movement.

7. In an apparatus of the character set forth, a holder for feathers having an outlet portion, and a suction-pipe communicating with said outlet, in combination with a drum arranged to receive the feathers from the suction-pipe, and means arranged between the drum and the suction-pipe for forming an air-current in said suction-pipe to draw the feathers through the same.

8. In an apparatus of the character set forth, a holder for feathers provided with an outlet and a suction-pipe communicating with said outlet, in combination with a drum arranged to receive the feathers from the suction-pipe and also having an outlet and provided with means for advancing the feathers to said outlet, and means arranged between the drum and the suction-pipe for creating an air current in said suction-pipe to draw the feathers through the same.

9. In an apparatus of the character set forth, a holder for feathers having an outlet portion, a suction-pipe communicating with said outlet portion, means for forming an air current in said pipe to draw the feathers through the same, in combination with a drum arranged to receive the feathers from the suction-pipe, and an expansion chamber arranged between said drum and the suction-pipe.

10. In an apparatus of the character set forth, a holder for feathers having an outlet portion, a suction-pipe communicating with said outlet portion, and means for forming an air current through said suction-pipe, in combination with a drum arranged to receive the feathers from said suction-pipe, and an expansion chamber having perforated walls arranged between the said drum and the suction-pipe.

11. In an apparatus of the character set forth, a holder for feathers having an outlet portion, a suction-pipe communicating with said outlet portion, and means for passing an air current through said suction-pipe, in combination with a drum arranged to receive the feathers from said suction-pipe, and means for delivering the feathers from the suction-pipe tangentially into the drum.

12. In an apparatus of the character set forth, a holder for feathers having an outlet, a suction pipe communicating at its inlet with the outlet of the holder, and a suction pump communicating with said suction pipe at its outlet portion, in combination with an expansion drum of greater cross-section than the suction pipe, the outlet of the suction pump being arranged to open into the expansion drum.

13. In an apparatus of the character set forth, a holder for feathers having an outlet, a suction pipe communicating at its inlet with the outlet of the holder, and a suction pump communicating with said suction pipe at its outer portion, in combination with an expansion drum of greater cross-section than the suction pipe and having perforated sides and an unobstructed interior, the outlet of the suction pump being arranged to open into the expansion drum.

14. In an apparatus of the character set forth, a holder for feathers having an outlet, a suction pipe communicating with said outlet, and means for forming an air current in said pipe to suck the feathers through the same, in combination with a drum having an inlet to receive the feathers from the suction pipe, and an outlet for the exit of the feathers, means to convey the feathers from the inlet to the outlet, and a second suction pipe connected to the outlet of the drum to draw the feathers from the drum, and an expansion chamber arranged between the drum and the first-named suction pipe.

15. In an apparatus of the character set forth, a feather-holder, means for loosening the feathers and means for feeding the feathers from the holder to the feather-loosening means, in combination with a feather-attaching device and a conduit leading from the feather-loosening means to the feather-attaching device, means for creating an air current in the conduit, and means for periodically opening and closing said conduit, whereby apportioned quantities of feathers are periodically advanced to the feather-attaching device.

16. In an apparatus of the character set forth, a feather-holder, means for loosening the feathers and means for feeding the feathers from the holder to the feather-loosening means, in combination with a feather-attaching device and a conduit leading from the feather-loosening means to the feather-attaching device, means for creating an air current in the conduit, and adjustable opening and closing means for, and arranged between, said conduit and the loosening means, whereby apportioned quantities of feathers are periodically advanced to the feather-attaching device and said quantities may be varied.

17. In an apparatus of the character set forth a feather-attaching device, a conduit for advancing feathers to the same, and means for creating an air current in said conduit, in combination with a valve arranged to open and close said conduit to the air current, a rock-lever secured to said valve, a rotary cam, and means for yieldingly holding the extremity of the rock-lever against the cam, whereby the lever is caused to periodically rock and the valve to periodically open and close the conduit.

18. In an apparatus of the character set forth, a feather-attaching device, a conduit for advancing feathers to the same and means for creating an air current in said conduit, in combination with a flap-valve arranged to open and close said conduit to the air current, a lever secured to said flap-valve and a rotary cam having an adjustable cam periphery, and means for yieldingly holding the lever against the cam periphery whereby the lever and the valve are caused to rock and to alternately open and close the conduit, and the duration of the opening at each period may be varied.

19. A mouth piece for a feather conduit, having a discharge orifice, in combination with retaining fingers extending across the orifice, said fingers being secured to the upper part of said orifice, their free ends extending downward toward the lower part of the orifice.

20. A mouth piece for a feather conduit having a discharge orifice, in combination with yielding retaining fingers secured at the upper part of said orifice, their free ends extending downward toward the lower part of the orifice.

21. A mouthpiece for a feather conduit, having a discharge orifice, said mouthpiece being provided with interior longitudinal ribs at its bottom, in combination with feather-retaining fingers extending downward from the upper portion of the orifice toward the longitudinal ribs.

22. In an apparatus of the character set forth, a feather-attaching mechanism and a feather conduit or pipe, and means for creating an air current in said conduit, said conduit terminating in a mouthpiece formed with a feather-retaining part, in combination with means for withdrawing successive quantities of feathers from behind said feather-retaining part.

23. In an apparatus of the character set forth, a feather attaching mechanism and a feather conduit or pipe, and means for creating an air current in said conduit, said conduit terminating in a mouth-piece, in combination with yielding retaining fingers arranged at the exit portion of the mouthpiece and means for withdrawing successive quantities of feathers from behind the fingers.

24. In an apparatus of the character set forth, a feather-attaching mechanism and a feather conduit or pipe; means for creating an air current in said conduit and a mouthpiece in which said conduit terminates, in combination with yielding retaining fingers arranged at the exit portion of the mouthpiece, and means arranged between the retaining fingers and the feather-attaching mechanism for withdrawing successive quantities of feathers from behind the retaining fingers.

25. In an apparatus of the character set forth, a feather-attaching mechanism, a conduit or pipe, means for blowing feathers through said conduit and a mouthpiece in which said conduit terminates, in combination with yielding retaining fingers arranged across the exit part of the mouthpiece, a series of rotary picker-needles arranged between the attaching mechanism and the retaining fingers and to travel between the retaining fingers.

26. In an apparatus of the character set forth, a feather-attaching mechanism, a conduit or pipe and means for blowing feathers through the conduit, said conduit terminating in a mouthpiece provided with a discharge orifice, in combination with a series of resilient fingers arranged across the orifice, and a rotary shaft provided with picker-needles arranged in advance of and yieldingly pressed toward the mouthpiece.

27. In an apparatus of the character set forth, mechanism for attaching feathers or similar loose and light material to a supporting layer, a conduit or pipe and means for creating an air current in said conduit, said conduit terminating in a mouthpiece provided with a discharge orifice, in combination with resilient fingers arranged across the orifice, a series of rotary picker-needles arranged in advance of the mouthpiece and to travel between the retaining fingers, and means for longitudinally adjusting the retaining fingers on the mouthpiece.

28. In an apparatus of the character set forth, mechanism for attaching feathers or similar loose and light material to a supporting layer, a conduit or pipe terminating in a mouthpiece provided with a discharge orifice, and means for creating an air current in said conduit, in combination with retaining fingers for the material passing through said conduit arranged across the discharge orifice, a pivoted frame in advance of said fingers, a rotary shaft provided with picker-needles journaled in said frame, said picker-needles being arranged to travel between the said fingers when the frame is swung down in front of the fingers.

29. In an apparatus of the character set forth, mechanism for attaching feathers or similar loose and light material to a supporting layer, a conduit or pipe and means for blowing the material to be attached through said conduit, said conduit terminating in a nozzle having a discharge-orifice for the material, in combination with longitudinal ribs at the bottom of the nozzle and extending to the orifice, and a series of retaining fingers extending from the top of the upper part of the orifice toward the said ribs.

30. In an apparatus of the character set forth, mechanism for attaching feathers or similar loose and light material to a supporting layer, a conduit or pipe, and means for blowing the material to be attached through said conduit, said conduit terminating in a nozzle having a discharge orifice, in combination with longitudinal ribs at the bottom of said nozzle and extending to the discharge orifice, and a series of retaining fingers extending downward from the upper portion of the orifice toward the ribs, said fingers being longitudinally adjustable on the nozzle.

31. In an apparatus of the character set forth, mechanism for attaching feathers or similar loose and light material to a supporting layer, a conduit or pipe and means for blowing the material to be attached through said conduit, said conduit terminating in a nozzle having a discharge orifice, in combination with longitudinal ribs at the bottom of the nozzle and extending to the discharge orifice, a series of fingers extending downward from the upper portion of the orifice toward the ribs, and rotary picker-needles arranged in advance of the mouthpiece and to travel between the fingers.

32. In an apparatus of the character set forth, mechanism for attaching feathers or similar loose and light material to a supporting layer, a conduit and means for blowing the said material through the same, said conduit terminating in a nozzle having a discharge orifice, in combination with longitudinal ribs at the bottom of the nozzle and extending to the discharge orifice, a series of resilient fingers extending toward the ribs from the upper part of the orifice and longitudinally adjustable on the nozzle, and rotary picker-needles arranged in advance of the nozzle and to travel between the fingers.

33. In an apparatus of the character set forth, a pipe or conduit and means for blowing feathers or similar material through said conduit, said conduit being provided with perforations and with longitudinal ribs at its perforated portion, in combination with a slide also provided with perforations, said slide being arranged to be shifted to cause its perforations to register with the perforations of the conduit or to close the said latter perforations.

34. In an apparatus of the character set forth, a pipe or conduit and means for blowing feathers or similar material through said conduit, said conduit terminating in a nozzle or mouth-piece having imperforate walls and a discharge orifice, in combination with interior longitudinal ribs arranged at top and bottom of the nozzle and extending to the orifice, to prevent the formation of eddy currents.

In testimony whereof I affix my signature.

FRITZ WEVER. [L. S.]